(12) United States Patent
Ottnad (10) Patent No.: US 10,722,978 B2
(45) Date of Patent: Jul. 28, 2020

(54) MACHINE FOR SEPARATIVE MACHINING OF PLATE-SHAPED WORK PIECES (71) Applicant: TRUMPF Werkzeugmaschinen GmbH + Co. KG, Ditzingen (DE)

(72) Inventor: Jens Ottnad, Karlsruhe (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 436 days.

(21) Appl. No.: 15/703,463

(22) Filed: Sep. 13, 2017

(65) Prior Publication Data
US 2018/0001421 A1    Jan. 4, 2018

Related U.S. Application Data (63) Continuation of application No. PCT/EP2016/053932, filed on Feb. 25, 2016.

(30) Foreign Application Priority Data

Mar. 13, 2015   (DE) .................. 10 2015 204 562

(51) Int. Cl.
*B23K 26/08*     (2014.01)
*B23K 26/38*     (2014.01)
(Continued)

(52) U.S. Cl.
CPC .......... *B23K 26/0853* (2013.01); *B23K 10/00* (2013.01); *B23K 26/083* (2013.01);
(Continued)

(58) Field of Classification Search
CPC .. B23K 26/0853; B26F 37/0235; B26F 3/004; H01J 37/31; B23Q 1/74
See application file for complete search history.

(56) References Cited

U.S. PATENT DOCUMENTS 2,322,380 A    6/1943  Mosley
3,054,333 A    9/1962  Brainard et al.
(Continued)

FOREIGN PATENT DOCUMENTS

CN    1743131    3/2006
CN    1929936    3/2007
(Continued)

OTHER PUBLICATIONS

Korean Office Action in Application No. 10-2018-7034348, dated Apr. 4, 2019, 16 pages (with English translation).
(Continued)

*Primary Examiner* — Geoffrey S Evans
(74) *Attorney, Agent, or Firm* — Fish & Richardson P.C.

(57) ABSTRACT

The invention relates to machines and methods for the separative machining of a plate-shaped workpieces. The machine includes a first movement device for moving the workpiece in a first direction (X), a second movement device for moving a machining head, which directs the machining beam onto the workpiece, along a second direction (Y), Between workpiece bearing faces there is formed a gap for the passage of the machining beam. In the machine, mutually facing side edges of at least two of the workpiece bearing faces are oriented non-perpendicularly and non-parallel with respect to the first direction (X).

14 Claims, 4 Drawing Sheets

(51) Int. Cl.
  *B23K 37/04*   (2006.01)
  *B23K 10/00*   (2006.01)
  *B23K 37/02*   (2006.01)
  *B26D 7/20*    (2006.01)
  *B26D 1/04*    (2006.01)

(52) U.S. Cl.
  CPC ...... *B23K 26/0869* (2013.01); *B23K 26/0876* (2013.01); *B23K 26/38* (2013.01); *B23K 37/0235* (2013.01); *B23K 37/04* (2013.01); *B23K 37/0408* (2013.01); *B26D 7/20* (2013.01); *B26D 1/04* (2013.01)

(56) References Cited

U.S. PATENT DOCUMENTS

| | | | |
|---|---|---|---|
| 3,422,246 A | 1/1969 | Wetzel | |
| 4,116,097 A | 9/1978 | Graham et al. | |
| 4,159,821 A | 7/1979 | Hickman | |
| 4,752,665 A | 6/1988 | del Santo | |
| 4,916,992 A | 4/1990 | Nasu | |
| 4,993,296 A | 2/1991 | Nasu | |
| 6,727,457 B1 | 4/2004 | Vande Berg | |
| 7,659,490 B2 | 2/2010 | Beilke | |
| 8,256,752 B2 | 9/2012 | Kilian et al. | |
| 8,294,061 B2 | 10/2012 | Schmauder | |
| 9,757,816 B2 | 9/2017 | Fujita et al. | |
| 2003/0066574 A1* | 4/2003 | Lovchik | B27C 9/00 144/382 |
| 2006/0118529 A1 | 6/2006 | Aoki et al. | |
| 2007/0221637 A1 | 9/2007 | Schurmann et al. | |
| 2008/0168876 A1 | 7/2008 | Kilian et al. | |
| 2009/0010731 A1 | 1/2009 | Heusel | |
| 2009/0315238 A1 | 12/2009 | Schroeder | |
| 2010/0181165 A1 | 7/2010 | Finn | |
| 2010/0252542 A1 | 10/2010 | Zeygerman | |
| 2013/0277343 A1 | 10/2013 | Finn | |
| 2014/0090443 A1 | 4/2014 | Schmauder et al. | |
| 2014/0216223 A1 | 8/2014 | Epperlein | |

FOREIGN PATENT DOCUMENTS

| | | | |
|---|---|---|---|
| CN | 101332568 | | 12/2008 |
| CN | 101415648 | | 4/2009 |
| CN | 201346719 | | 11/2009 |
| CN | 101873909 | | 10/2010 |
| CN | 102099153 | | 6/2011 |
| CN | 102281986 | | 12/2011 |
| CN | 202336634 | | 7/2012 |
| DE | 35 09 418 | | 9/1986 |
| DE | 36 20 896 | | 1/1987 |
| DE | 39 17 253 | | 1/1994 |
| DE | 102004059766 A1 | | 6/2006 |
| DE | 102011051170 A1 | | 12/2012 |
| DE | 102011054360 | | 4/2013 |
| DE | 102011054361 | | 4/2013 |
| EP | 0 927 597 | | 7/1999 |
| EP | 2 008 752 | | 12/2008 |
| EP | 1 901 893 | | 3/2011 |
| EP | 2 527 058 | | 11/2012 |
| JP | 61206586 A | | 9/1986 |
| JP | 63-278694 | | 11/1988 |
| JP | 01252396 A | * | 10/1989 |
| JP | 2-30332 | | 1/1990 |
| JP | 2-274494 | | 11/1990 |
| JP | H 03254381 | | 11/1991 |
| JP | 05050346 A | * | 3/1993 |
| JP | 6-170469 | | 6/1994 |
| JP | H06170469 | | 6/1994 |
| JP | 7-290267 | | 11/1995 |
| JP | 10-118879 | | 5/1998 |
| JP | H 10-166175 | | 6/1998 |
| JP | H 10 296478 | | 11/1998 |
| JP | 2000-246564 | | 9/2000 |
| JP | 2001/170727 | | 6/2001 |
| JP | 2003-245838 | | 9/2003 |
| JP | 2004-050184 | | 2/2004 |
| JP | 2007160811 | | 6/2007 |
| JP | 2008264996 | | 11/2008 |
| JP | 2012515657 | | 7/2012 |
| JP | 2013-119101 | | 6/2013 |
| WO | WO2008138370 A1 | | 11/2008 |
| WO | WO-2010085486 A1 | * | 7/2010 ......... B23K 37/0461 |
| WO | WO2010085486 A1 | | 7/2010 |
| WO | WO 2013/053569 | | 4/2013 |

OTHER PUBLICATIONS

Office Action in Japanese Application No. 2017-548287, dated Jul. 12, 2018, 6 pages (with English translation).

Office Action in Chinese Application No. 201480069791.1, dated Sep. 21, 2017, 18 pages (with English translation).

International Preliminary Report on Patentability for PCT Application No. PCT/EP2016/053932, dated Sep. 28, 2017, 17 pages.

International Search Report for PCT Application No. PCT/EP2016/053932, dated Jun. 24, 2016, 4 pages.

* cited by examiner

MACHINE FOR SEPARATIVE MACHINING OF PLATE-SHAPED WORK PIECES

CROSS-REFERENCE TO RELATED APPLICATIONS

This application is a continuation of and claims priority under 35 U.S.C. § 120 from PCT Application No. PCT/EP2016/053932 filed on Feb. 25, 2016, which claims priority from German Application No. 10 2015 204 562.5, filed on Mar. 13, 2015. The entire contents of each of these priority applications are incorporated herein by reference.

TECHNICAL FIELD

The present disclosure relates to machines that cut workpieces using processing beams such as lasers.

BACKGROUND

Japanese patent publication JP 5050346A discloses a machine for the separative machining of plate-shaped workpieces by means of a laser beam, in the form of a combined laser and punching machine. The machine disclosed by JP 5050346A implements hybrid movement control, in which the workpiece is moved in a first direction (X direction) and the machining head is moved in a second direction (Y direction). The displacement of a workpiece bearing, to prevent damage by the machining beam, is interrupted in the movement range of the machining head. Therefore, in the workpiece bearing, a gap extends in the Y direction between two workpiece bearing faces or workpiece bearings. The machining beam that has passed through the workpiece, and any slag or cutting scraps formed, are discharged through the gap. The machining beam can be a laser beam, though the use of some other type of high-energy beam, for example in the form of a plasma arc or a water jet, is also possible.

In the case of such a machine, efforts are focused on keeping the gap required for the passage of the machining beam as small as possible in order to ensure the best possible workpiece support. If such a (laser) processing machine is to have an additional axis for movement of the machining head in an X direction, it is however necessary for the gap to have a minimum width that corresponds at least to the movement range of the machining head in the X direction.

Regardless of the width of the gap, it is potentially possible for collisions with downwardly hanging workpiece parts to occur at those side edges of the workpiece bearings that delimit the gap. For example, during the machining or separating cutting, a situation may arise in which a cut off workpiece part or individual contour sections of the workpiece part are supported only by one of the workpiece bearings. In particular, in the case of a separation cut, this can, owing to the action of the cutting gas pressure on the workpiece part that has been cut off, lead to restrictions in process reliability, because the workpiece part that has been cut off can tilt into the gap. Furthermore, in the case of long, thin workpiece parts, a situation may arise in which the workpiece part bends into the gap.

SUMMARY

The present disclosure relates to machines for separative machining, e.g. cutting a stamping, of plate-shaped workpieces. In particular, the present disclosure relates to laser processing machines that provide improved support of workpiece parts during separative machining processes In certain embodiments, this is achieved by machines described herein. The machines include a machining head configured to direct the processing beam onto the plate-shaped workpiece. The machines include a first movement device configured to bidirectionally move the plate-shaped workpiece in a first direction (X). The machines include a second movement device configured to bidirectionally move the machining head in a second direction (Y). The machines include at least two workpiece support units including at least two workpiece bearing faces for supporting the workpiece. A gap configured for the passage of the processing beam is formed between the workpiece bearing faces. Mutually facing side edges of at least two of the workpiece bearing faces that delimit the gap are oriented non-perpendicularly and non-parallel with respect to the first movement direction.

In some implementations, the plate-shaped workpieces that are separatively machined are generally rectangular or possibly square blanks, the outer edges of which are oriented parallel or perpendicular to one another. In the case of the machines described herein, the movement of the workpiece along the first direction typically takes place parallel to an outer edge of such a rectangular or square plate-shaped workpiece. The machines themselves also typically have outer edges that are oriented parallel or perpendicular to the outer edges of the rectangular or square workpiece to be machined.

In the context of this disclosure, a movement that is enabled by a respective movement device in an associated direction is to be understood to mean a bidirectional movement (back-and-forth movement), i.e., both a movement in a positive direction and a movement in a negative direction. For example, the first movement device is configured for the bidirectional movement of the workpiece in the first direction (X direction), i.e., for the movement of the workpiece both in the positive and in the negative X direction. Correspondingly, the second movement device is also configured for the bidirectional movement of the machining head in the second direction (Y direction) that is in particular perpendicular to the first direction, e.g., for the movement of the machining head both in the positive and in the negative Y direction.

In certain implementations, the machining head is configured to direct the machining beam toward the workpiece along a third direction (Z direction) that is perpendicular to the first and second directions. The machine can include a drive unit configured to displace the machining head bidirectionally in the third direction. The drive unit can displace the machining head both in the positive and in the negative Z direction. The movement of the machining head in the Z direction serves for adjusting the spacing between the workpiece and the machining head in the Z direction.

Various embodiments of the invention make use of the fact that a majority of the workpiece parts that are manufactured on a machine of this type for the cutting machining of plate-shaped workpieces, for example on a laser flat-bed machine, have approximately rectangular outer dimensions and an approximate orientation of their inner contours at 0° or 90° angles with respect to the respective outer edges of the rectangular or square plate-shaped workpiece. A deviating orientation, for example a rotation, of mutually facing side edges of two or more of the workpiece bearing faces in relation to the normal position of the workpiece parts manufactured on the machine therefore considerably reduces the frequency of occurrence of workpiece regions hanging into the gap, for example in the form of sheet-metal tongues. In the case of the machine according to certain embodiments of the invention described herein, only workpiece regions with elongate, narrow contours, which run substantially at the same angle as those side edges of the workpiece bearing faces that are not oriented parallel or perpendicular to the first direction, are at risk of hanging into the gap and possibly causing collisions.

In particular embodiments, the mutually facing side edges, which are oriented non-perpendicularly and non-parallel with respect to the first direction, are formed on two stationary workpiece bearing faces. In these embodiments, the workpiece bearing faces are, for example, two (stationary) workpiece bearing tables, between which the gap for the passage of the machining beam can be formed. In these embodiments, the gap typically extends over the entire width of the workpiece bearing tables (along the Y direction), but does not run perpendicular to the X direction, i.e., the gap is oriented at an angle both with respect to the X direction and with respect to the Y direction. In certain implementations, the mutually facing side edges of the stationary workpiece bearing faces are oriented parallel to one another and have a constant spacing to one another, i.e., the gap has a constant width. The mutually facing side edges of the workpiece bearing faces may alternatively have, for example, an arcuate geometry or a variable spacing.

In the context of this disclosure, a workpiece bearing face is to be understood to mean a workpiece bearing that is suitable for aerially supporting the plate-shaped workpiece. A workpiece bearing face of the aforementioned type need not form a continuous face, it rather sufficing for the workpiece to be supported (possibly only in punctiform fashion) at multiple (at least three, generally considerably more) locations by bearing elements in order for the workpiece to be mounted in a bearing plane. The workpiece bearing face is in this case formed by the topsides of the bearing elements. The stationary workpiece bearing faces, between which the gap is formed, may for example be formed in the manner of a brush or ball table. The workpiece to be machined is in this case supported, during the machining process, by a large number of bearing elements that are arranged on or in a table face in the form of brushes or (rotatable) balls, which together form the workpiece bearing face. Alternatively, rotatable rollers can be provided as bearing elements for forming workpiece bearing faces. It is furthermore possible for the workpiece bearing faces to be formed as revolving bearing belts.

In certain embodiments, the side edges of the two stationary workpiece bearing faces are oriented at an angle with respect to the second direction, in particular if the second direction runs parallel to the Y direction, i.e., perpendicular to the first direction. Alternatively, the side edges of the stationary workpiece bearing faces and the second direction may run parallel to one another and non-perpendicularly with respect to the first direction. In these implementations, a stationary portal, to which a movement device in the form of a carriage for the controlled movement of the machining head is attached, may possibly be oriented parallel to the direction of the gap. The angle with respect to the second direction may amount to between 0° and 45°, between 20° and 40°, or between 25° and 35°.

In particular embodiments, the machine has an additional movement device (additional axis) for moving the machining head in the first direction (X direction). The additional movement device is designed to move the machining head bidirectionally in the first direction, i.e., both in the positive and in the negative X direction. This is advantageous in particular if the side edges of the stationary workpiece bearing faces run non-parallel with respect to the second direction. In such embodiments, the movement range of the machining head in the X direction (e.g., the movement range of the additional axis) may ideally correspond to the entire extent of the gap in the X direction, in order that the workpiece can be machined by cutting at any desired position between the two stationary workpiece bearing faces, without the machine component (normally a portal) that bears the machining head having to be moved. Because of the reduced masses that have to be accelerated, the additional axis movement of the machining head in the X direction is more dynamic than the movement of the workpiece in the X direction, such that, in particular, it is possible for small contours to be realized very much more quickly by means of the axis movement of the additional axis, possibly in combination with the movement of the workpiece in the X direction.

In certain embodiments, at least two support carriages, which are in particular movable independently of one another (in controlled fashion), are arranged between two stationary workpiece bearing faces, which support carriages have in each case one workpiece bearing face for supporting workpiece parts that are cut during the cutting machining process, wherein those side edges of the workpiece bearing faces of the support carriages that face toward one another are oriented non-perpendicularly and non-parallel with respect to the first movement direction. In these embodiments, the gap through which the machining beam passes is delimited not only by the mutually facing side edges of the stationary workpiece bearing faces but also by the mutually facing side edges of the movable workpiece bearing faces of the support carriages.

In particular embodiments described herein, the at least two support carriages are arranged between the stationary workpiece bearing faces of the machine, the workpiece bearing faces of which support carriages typically extend between the stationary workpiece bearing faces approximately over the entire width of the gap. The support carriages are movable parallel to the side edges of the stationary workpiece bearing faces and form a lateral delimitation of the gap. The two support carriages can be moved independently of one another, though a coupled movement is also possible, in the case of which the two support carriages are moved synchronously, i.e., with a constant relative spacing, parallel to the side edges of the stationary workpiece bearing faces. The region between the workpiece bearing faces of the support carriages forms the cutting region itself, i.e., the gap.

The gap formed between the support carriages should be as small as possible in order to support cut workpiece parts, and secondly, it should also be ensured that slag formed during the cutting process does not soil the workpiece bearing faces adjoining the gap. By means of the independent mobility of the support carriages, the cutting region or gap is variable in terms of its extent, such that its extent can be adapted to the respective cutting task. The cutting region or the gap may furthermore be positioned at different positions along the side edges of the stationary workpiece bearing faces.

The support carriages are typically movable independently of the machining head in a direction that runs parallel to the direction along which the side edges of the stationary workpiece bearing faces run. The direction may run at an angle with respect to the Y direction (see above), though it is also possible for the direction to run parallel to the Y direction (see below). For an independent movement of the support carriages and of the machining head in the gap, use is typically made of different drives that make it possible for each of the support carriages and the machining head to be moved independently of one another to different positions.

Also, the support carriages may have, on their side facing toward the workpiece, a continuous workpiece bearing face that can be moved to abut against the workpiece bottom side. Alternatively, the support carriages may have multiple bearing elements, for example in the form of bearing pins (pins), balls, brushes or ridges, which together form the workpiece bearing face on which the workpiece or workpiece parts that have been separated by cutting can bear. In addition to the two support carriages between which the cutting machining is performed by means of the machining head, it is possible for further support elements, for example in the form of further movable support carriages, to be arranged between the stationary workpiece bearing faces outside the gap, that further support elements permit improved support of the workpiece even at a relatively great distance from the machining head.

If the mutually facing side edges of the stationary workpiece bearing faces are oriented non-perpendicularly and non-parallel with respect to the first direction and thus with respect to the outer edges of the workpiece, the two support carriages or the workpiece bearing faces thereof may have a simple square or rectangular geometry, because, owing to the arrangement of the support carriages in the gap oriented obliquely with respect to the workpiece outer edges, the mutually facing side edges of the support carriages are likewise oriented obliquely. In this case, it is however necessary for the machining head, too, to be moved obliquely with respect to the workpiece outer edges (e.g., obliquely or at an angle with respect to the X direction or with respect to the Y direction), which places greater demands on the contour programming than in the case of side edges of the stationary workpiece bearing faces being oriented parallel to the Y direction.

In certain embodiments, the side edges of the two stationary workpiece bearing faces are oriented perpendicularly with respect to the first direction and thus parallel with respect to the outer edges of the workpiece. In these embodiments, the movement device is designed for moving the machining head in the first direction (by means of additional axis) along a movement range that typically corresponds to the extent of the gap in the X direction. Because of the orientation of the mutually facing side edges of the stationary workpiece bearings perpendicularly with respect to the first direction, the contour programming is simplified. To realize the non-perpendicular and non-parallel orientation of the side edges of the workpiece bearing faces of the support carriages, it is necessary in this case for the support carriages or the workpiece bearing faces thereof to have a form that deviates from a square or rectangular geometry.

In certain embodiments, the mutually facing side edges, or the side edges that face toward one another, of the workpiece bearing faces of the two support carriages run rectilinearly and at an angle with respect to the first direction. In such embodiments, the two support carriages or the workpiece bearing faces thereof may for example be of trapezoidal form, in particular in the manner of a right-angled trapezium. In the cases of such a support carriage or a workpiece bearing face in the form of a right-angled trapezium, a side edge (limb) averted from the gap runs at right angles to the base sides, which are oriented parallel with respect to the side edges of the stationary workpiece bearing faces.

In particular implementations, the mutually facing side edges of the workpiece bearing faces of the two support carriages run at an angle of between 20° and 40° with respect to the first direction. The side edges, which typically are oriented parallel and run at an angle with respect to the first direction (X direction) of the support carriages, have the effect that, in the event of a movement of the machining head in the X direction, the support carriages must move in the Y direction in order that the position of the gap situated between the support carriages follows the movement of the machining head. In the actuation of the support carriages, it is therefore necessary to take into consideration, in transformed form, the position of the so-called "tool center point," which corresponds to the machining position and that results from the movement of the workpiece in the X direction and of the additional axis for the movement of the machining head in the X direction.

Here, the required movement travel of the support carriages in the Y direction becomes greater as the angle (between 0° and 45°) between the mutually facing side edges of the workpiece bearing faces of the support carriages and the first direction (X direction) increases. By contrast, the process reliability, i.e., the reliability with which a workpiece part of any shape is always supported by both support carriages during the cutting of the contour, increases with increasing angle. A good compromise between supporting action and required dynamics for the movement of the support carriages in the Y direction is achieved in the case of an angle of between 20° and 40°, between 25° and 35°, or of an angle of 30°.

In certain embodiments, the mutually facing side edges of the workpiece bearing faces of the two support carriages have no straight (linear) but arcuate side edges. An arcuate side edge is to be understood to mean a side edge that deviates from a straight line at least along a subregion of its extent. Such an arcuate side edge may have one or more arcuate sections with possibly different (even oppositely directed) curvature. The two arcuate side edges of the workpiece bearing faces of the two support carriages are typically of complementary form with respect to one another, e.g., if the two support carriages are arranged adjacent to one another, the mutually facing side edges make contact, and the gap is closed.

By means of the arcuate side edges, the parallelism between the side edges of the support carriages and the outer or inner contours of the cut workpiece parts can be further reduced. Furthermore, the risk of sections of the workpiece parts hanging down into the gap between the support carriages is reduced. However, by means of the arcuate side edges, the complexity in the actuation of the movement of the support carriages increases.

In particular embodiments, at least one of the mutually facing side edges of the workpiece bearing faces of the support carriages has a bevel or a rounding. By means of the bevel or the rounding, it is possible for collisions of the support carriages with downwardly hanging workpiece parts to be prevented with even greater effectiveness, because the edges of the workpiece parts slide upward along the bevel or rounding, such that they pass into the workpiece bearing plane or onto the workpiece bearing faces.

In certain embodiments, at least one support carriage, along its bottom side averted from the workpiece bearing face, tapers toward that side edge of the workpiece bearing face that faces toward the facing side edge of the other support carriage. The support carriage may for example have, below the workpiece bearing face or along the bottom side thereof, an obliquely running recess or a bevel, such that the thickness of the support carriage increases with increasing distance to the side edge, such that the support carriage has as small a thickness as possible at the side edge that delimits the gap. In this way, it can be achieved that as small as possible an amount of slag formed during the cutting machining process adheres to the support carriage.

In particular embodiments, the workpiece bearing face of at least one support carriage is formed, at the side edge of the workpiece bearing face, from a metallic material, in particular from copper. Those subregions of the workpiece bearing faces that delimit the gap are ideally manufactured from copper, because copper exhibits good conductivity and the slag formed during the cutting of steel and aluminum does not adhere well to copper. To provide the side edge of the workpiece bearing face with a metallic material, it is possible for a metal plate, for example a copper sheet, to be attached to the support carriage in the region of the side edge, which metal plate has a geometry that is adapted to the geometry of the support carriage. A metal plate of the aforementioned type may be exchangeable, i.e., may be fastened to the support carriage by means of a releasable connection, for example by screw connection.

In particular embodiments of the machine, the workpiece bearing face of at least one support carriage has a plate-shaped subregion on which the side edge of the workpiece bearing face is formed. The plate-shaped subregion may for example be a plate-shaped section of a metal plate, for example of a copperplate, which is fastened in the region of the side edge to the support carriage. The plate-shaped subregion makes it possible to realize a distance between the side edge and the rest of the support carriage and thus a distance to the gap at which the cutting machining by means of the machining beam is performed.

In various embodiments, the workpiece bearing face of the at least one support carriage has a subregion that is in the form of a corrugated sheet. The corrugated sheet may directly adjoin the plate-shaped subregion, which is for example formed from a metal sheet, in particular a copper sheet. A corrugated sheet forms a stable workpiece bearing face with good sliding characteristics for the workpiece.

At least one support carriage may have a workpiece bearing face that has a (further) subregion that can be formed as a brush-type bearing. The brush-type bearing may adjoin the metallic side edge or the plate-shaped subregion or possibly the corrugated sheet. The brush-type bearing supports the borne workpiece or workpiece part without scratching the latter. The plate-shaped subregion of the support carriage and/or the corrugated sheet may serve as a barrier between the machining beam and the brush-type bearing to prevent damage to the brushes as a result of flying sparks.

The machine tool typically comprises a control device that is designed or programmed to position at least one of the support carriages, in particular exactly two, of the support carriages under a workpiece part that is to be separated by cutting during the cutting machining process. The workpiece part is typically a workpiece part that is at risk of tilting and that is separated by cutting from the rest of the workpiece in a gap that is formed between the two support carriages. After the separation by cutting, the workpiece part that has been fully separated by cutting lies at least partially on the workpiece bearing face or ideally on the workpiece bearing faces of one or both support carriages, in such a way that the workpiece bearing faces prevent the workpiece part from performing a tilting movement caused by the cutting gas pressure (or water pressure).

The control device serves for the controlled movement of the support carriages parallel to the side edges of the stationary workpiece bearing faces. The positioning of the support carriages may take place synchronously with the movement of the machining head in the Y direction and possibly in the X direction. The movement of the support carriages may, however, also take place independently of the movement of the machining head in the Y direction. In this way, the support carriages, if they are not required, for example, in the case of the cutting of large workpiece parts, can be arranged spaced apart from the machining position at which the machining beam is positioned, and can for example be moved into a parked position outside the movement range of the machining head. If the support carriages are required for supporting workpiece parts that are at risk of tilting, the support carriages can be arranged to adjoin one another adjacent to the machining position.

Further advantages of the invention will emerge from the description and from the drawing. Likewise, the features mentioned above and the features specified in more detail below may be used individually or in arbitrary mutual combinations. The embodiments that are shown and described are not to be understood as an exhaustive list, but rather are of exemplary nature for outlining the invention.

DETAILED DESCRIPTION

In the following description of the drawings, identical reference signs will be used for identical or functionally identical components.

Figure 1A:
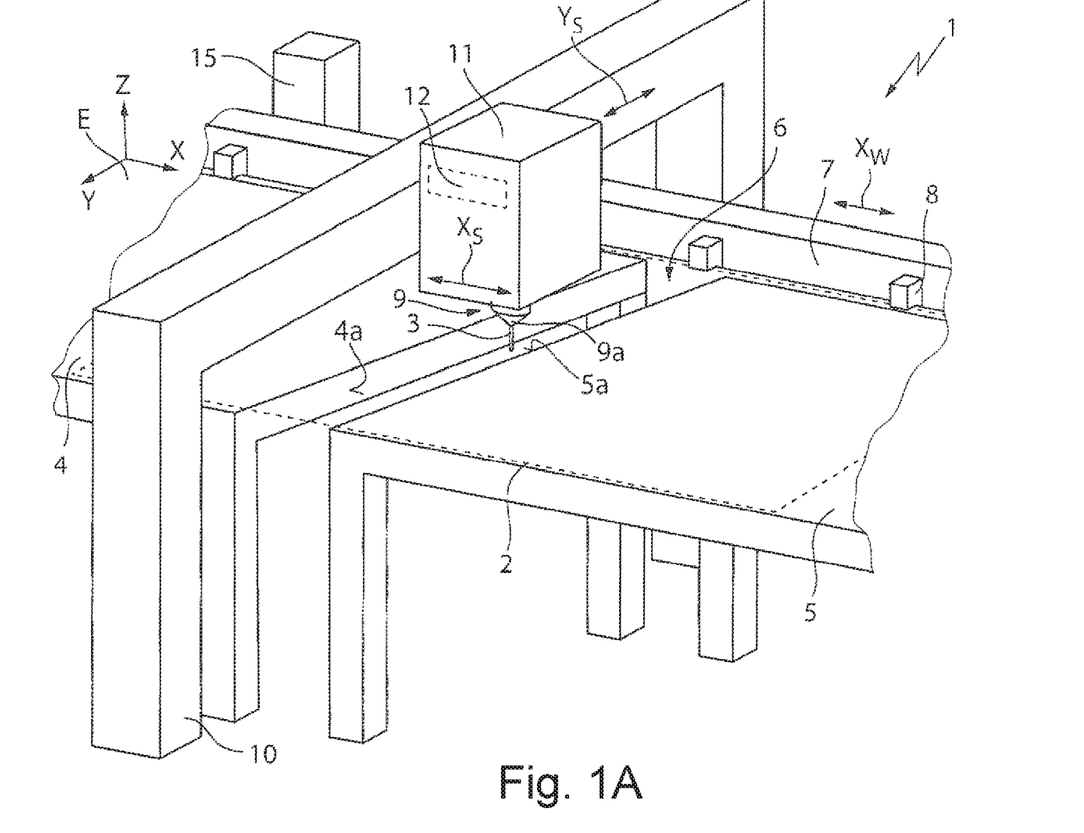
FIGS. 1A and 1B are illustrations of a laser-processing machine with two stationary workpiece bearing faces, the mutually facing side edges of which are oriented at an angle with respect to a first direction (X direction) along which a workpiece that is to be machined by cutting is moved.
Figure 1B:
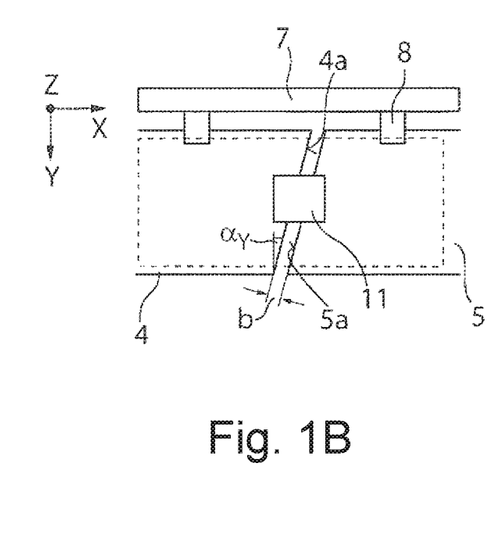

FIGS. 1A and 1B show an exemplary construction of a machine 1 for the laser machining, more specifically for the laser cutting, of a plate-shaped workpiece 2 (illustrated by dashed lines) by means of a laser beam 3. For the cutting machining of the workpiece 2, instead of the laser beam 3, use may also be made of some other type of thermal machining beam, for example a plasma torch, or a water jet. During the machining, the workpiece 2 lies on two stationary workpiece bearing faces 4, 5 that, in the example shown, form the top sides of two workpiece tables and define a bearing plane E (X-Y plane of an XYZ coordinate system) for bearing the workpiece 2. The workpiece bearing faces 4, 5 may be formed by table surfaces or by pin-like bearing elements (pins), bearing belts, brushes, rollers, balls, air cushions or the like.

By means of a conventional movement and holding device 7, which has a drive and clamping devices 8 in the form of clamping brackets for holding the workpiece 2, the workpiece 2 can be displaced in controlled fashion on the workpiece bearing faces 4, 5 in a first direction X (hereinafter referred to as X direction) and moved to a predefined workpiece position W. To facilitate the movement of the workpiece 2 in the X direction, it is possible for brushes, balls or slide rollers, which constitute the actual workpiece bearing faces 4, 5, to be mounted on the workpiece tables shown in FIG. 1. Alternatively, it is for example possible, for the movement or for assisting the movement of the workpiece 2 in the X direction, for the workpiece bearing faces 4, 5 themselves to be configured as a movement device, for example in the form of a (revolving) conveyor belt, as is described, e.g., in the applicant's DE 10 2011 051 170 A1, or in the form of a workpiece bearing as described, e.g., in JP 06170469.

Between the two stationary workpiece bearing faces 4, 5 there is formed a gap 6, which is oriented at an angle αY with respect to the Y direction, as can be seen in particular from FIG. 1B. The gap 6 is delimited laterally by two mutually facing side edges 4a, 5a, which in the example shown are oriented parallel, of the stationary workpiece bearing faces 4, 5. The gap 6 extends in a second direction (hereinafter referred to as Y direction) over the entire width of the two workpiece bearing faces 4, 5. A laser cutting head 9 that directs and focuses the laser beam 3 on the workpiece 2 is movable in controlled fashion in the Y direction by means of a driven carriage 11 that serves as movement device and that is guided on a stationary portal 10. In the example shown, the laser cutting head 9 is additionally also movable in the X direction and may be movable in controlled fashion in the X direction by means of an additional movement device 12, for example in the form of a linear drive, which is mounted on the carriage 11. The maximum movement travel of the laser cutting head 9 corresponds to the extent of the gap 6 in the X direction. As can be seen in FIG. 1B, the extent is greater than the width b of the gap 6 owing to the orientation of the gap 6 at the angle αY with respect to the Y direction.

By means of the movement devices 11, 12 constructed one upon the other, the laser cutting head 9 can be positioned both in the X direction and in the Y direction at a desired cutting head position XS, YS within the gap 6. The laser cutting head 9 can possibly also be displaced along a third movement direction Z (gravitational force direction, hereinafter referred to as Z direction) to adjust the spacing between a machining nozzle 9a of the laser cutting head 9 and the workpiece surface.

As can be seen in FIG. 1A, the laser beam 3 passes through between the two side edges 4a, 5a, which laterally delimit the gap 6, of the stationary workpiece bearing faces 4, 5 in order to machine the workpiece 2 by cutting. As can likewise be seen in FIGS. 1A and 1B, the plate-shaped workpiece 2 (metal sheet) commonly has a rectangular geometry, and the outer edges of the workpiece 2 run parallel or perpendicular to the X direction. Also, a majority of the workpiece parts separated from the workpiece 2 by cutting commonly have approximately rectangular outer dimensions and—if present—inner contours oriented at a 0° or 90° angle with respect to the outer edges of the workpiece 2.

The rotation of the gap 6 relative to the X direction and Y direction and thus relative to the outer edges of the workpiece 2, i.e., in relation to the normal position of the parts, considerably reduces the likelihood of occurrence of sheet-metal tongues hanging into the gap 6, because only elongate, narrow contour regions of workpiece parts, which extend parallel to the direction of the gap 6, i.e., whose longitudinal side runs substantially at the angle αY with respect to the Y direction, are at risk of hanging into the gap 6. For the support of the workpiece 2 or of workpiece parts that have been separated from the workpiece 2 by cutting during the cutting machining process, it is thus advantageous if the two side edges 4a, 5a of the stationary workpiece bearing faces 4, 5 are oriented at an angle αY with respect to the Y direction, i.e., are neither perpendicular nor parallel to the Y direction. The angle αY enclosed by the side edges 4a, 5a of the stationary workpiece bearing faces 4, 5 with the Y direction can lie between 0° and 45°, between 20° and 40°, or between 25° and 35°.

Figure 2:
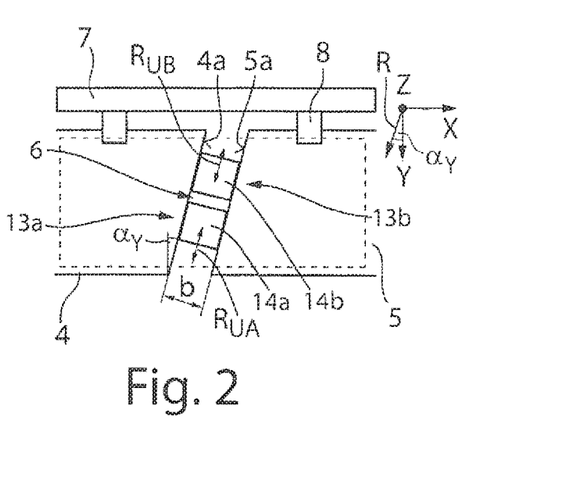
FIG. 2 is an illustration of a detail of a machine similar to one shown in FIGS. 1A and 1B, in the case of which two mutually independently movable support carriages are arranged in a gap formed between the two stationary workpiece bearing faces.

For additional support of the workpiece 2, more specifically for supporting workpiece parts that are cut during the cutting machining process, it is possible, as illustrated in FIG. 2, for two support carriages 13a, 13b to be arranged in the gap 6 shown in FIGS. 1A and 1B. The two support carriages 13a, 13b extend in each case over the entire width b of the gap 6, and are movable in controlled fashion independently of one another in the gap 6 in a displacement direction R that runs at the angle $\alpha_Y$ with respect to the Y direction. The controlled movement of the support carriages 13a, 13b between the side edges 4a, 5a of the stationary workpiece bearing faces 4, 5 may be performed, for example, by means of spindle drives, wherein the spindle nut is attached to the respective support carriage 13a, 13b and the spindles and the drive motor are attached to one of the two stationary workpiece bearings 4, 5. The controlled movement of the support carriages 13a, 13b may also be realized in other ways in accordance with particular implementations.

The support carriages 13a, 13b can be moved in the gap 6 in each case to a desired position $R_{UA}$, $R_{UB}$ along the displacement direction R, to support the workpiece 2, more specifically workpiece parts that are to be separated from the workpiece 2 by cutting or that have been cut during the machining process, by means of a workpiece bearing face 14a, 14b attached to the respective support carriage 13a, 13b. In the situation shown, the workpiece bearing face 14a, 14b of a respective support carriage 13a, 13b terminates flush with the workpiece bearing faces 4, 5 in the Z direction, e.g., the workpiece bearing faces 14a, 14b of the support carriages 13a, 13b are situated in the bearing plane E for the workpiece 2 (see FIG. 1A). In the example of a machine 1 for cutting machining as shown in FIG. 2, the gap 6 through which the laser beam 3 passes is formed between the movable workpiece bearing faces 14a, 14b of the two support carriages 13a, 13b and the side edges 4a, 5a of the two stationary workpiece bearing faces 4, 5.

To control the cutting machining process, the machine 1 has a control device 15 that serves for coordinating the movements of the workpiece 2, of the laser cutting head 9 and of the support carriages 13a, 13b in order to set a desired workpiece position W, a desired cutting head position XS, YS and a desired position $R_{UA}$, $R_{UB}$ of the support carriages 13a, 13b in order to permit the cutting of a predefined cut contour and support the workpiece in the vicinity of the gap 6 as necessary.

The movement of the support carriages 13a, 13b may be performed synchronously, i.e., the spacing between the position $R_{UA}$ of the first support carriage 13a and the position $R_{UB}$ of the second support carriage in the displacement direction R is constant during the movement. The movement of the first support carriage 13a may also be performed independently of the movement of the second support carriage 13b, i.e., the spacing between the position $R_{UA}$ of the first support carriage 13a and the position $R_{UB}$ of the second support carriage 13b in the displacement direction R varies during the movement along the displacement direction R.

By means of the orientation of the two side edges 4a, 5a of the stationary workpiece bearing faces 4, 5 at the angle $\alpha Y$ with respect to the Y direction, the gap 6 is rotated relative to the position of the workpiece 2 in the XY plane. The mutually facing side edges 16a, 16b, which delimit the gap 6, of the two support carriages 13a, 13b therefore also run obliquely with respect to the outer edges of the workpiece 2 in the case of the square geometry of the two support carriages 13a, 13b, or of the workpiece bearing faces 14a, 14b thereof, shown in FIG. 2.

Figure 3A:
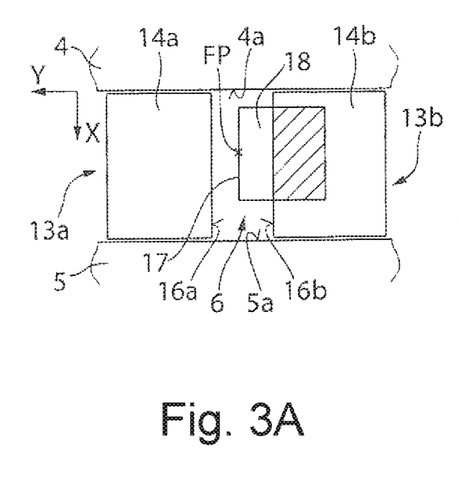
FIGS. 3A and 3B are illustrations of two support carriages, the mutually facing side edges of which are oriented parallel to the X direction, during the separation of two workpiece parts by cutting.

By contrast, FIG. 3A shows the situation in which the two stationary workpiece bearing faces 4, 5, or the mutually facing side edges 4a, 5a thereof, are oriented parallel to the Y direction. During the separation of a workpiece part 18 by cutting along the cut contour 17 thereof, which runs parallel and perpendicular to the X direction, a situation may arise in which, in the end position in which the workpiece part 18 has been entirely separated from the remaining workpiece at a separation-by-cutting position FP, the workpiece part lies only on the workpiece bearing face 14b of one of the two support carriages 13b, such that the workpiece part is supported only in that subregion of the workpiece bearing face 14b that is illustrated by hatching in FIG. 3A. The action of the cutting gas, or the action of pressure thereof, in the region of the separation-by-cutting position FP gives rise to a risk of tilting of the workpiece part 18 that has been separated by cutting. Furthermore, the workpiece part 18 may bend downward in the region of the separation-by-cutting position FP.

Figure 3B:
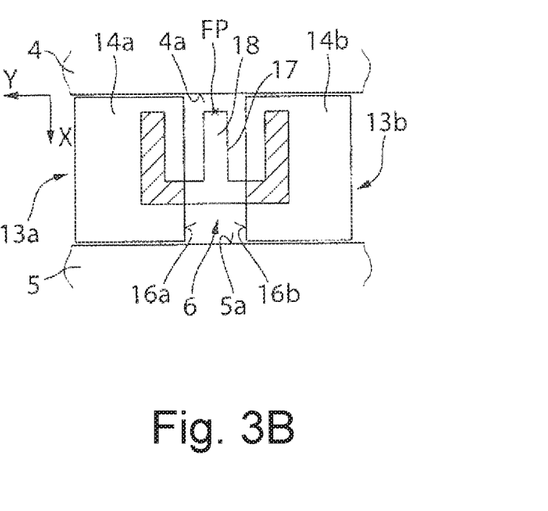

Also, in the example shown in FIG. 3B, in which the workpiece part 18 that has been separated by cutting lies on the workpiece bearing faces 14a, 14b of both support carriages 13a, 13b, in the case of the contour 17 of the workpiece part 18 shown in FIG. 3B, which has three tongue-like subregions extending in the X direction, a situation may arise in which the central tongue-like subregion, which is arranged in the gap 6 and that is not supported by the two workpiece bearing faces 14a, 14b, bends and in so doing hangs downward into the gap 6. In this case, during the displacement of the support carriages 13a, 13b, a collision with the non-supported tongue-like subregion can occur.

The orientation of the mutually facing side edges 16a, 16b of the workpiece bearing faces 14a, 14b of the two support carriages 13a, 13b parallel to the X direction, as shown in FIGS. 3A and 3B, can thus, in the case of workpiece parts whose outer contour 17 is oriented perpendicular or parallel to the X direction, lead to restrictions in process reliability.

Figure 4A:
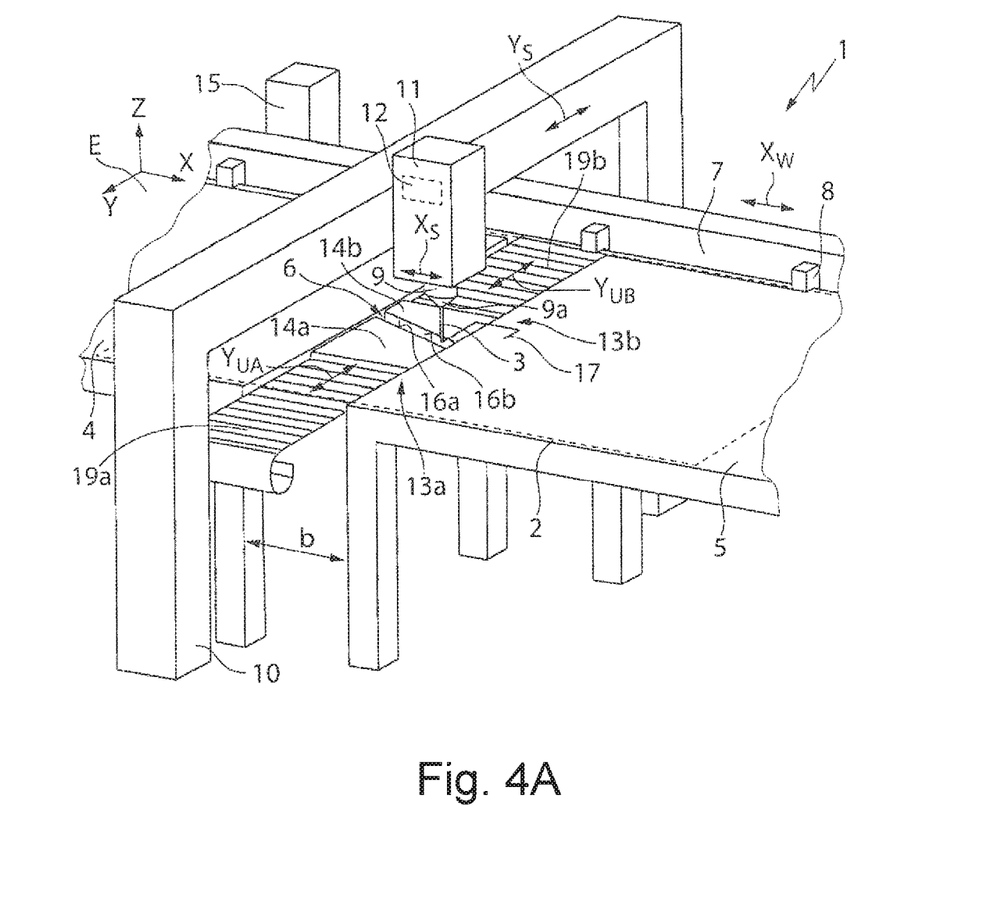
FIGS. 4A and 4B are illustrations of a laser-processing machine with two stationary workpiece bearing faces, the side edges of which are oriented perpendicularly with respect to the X direction and between which there are arranged two movable support carriages, the mutually facing side edges of which are oriented at an angle with respect to the X direction.
Figure 4B:
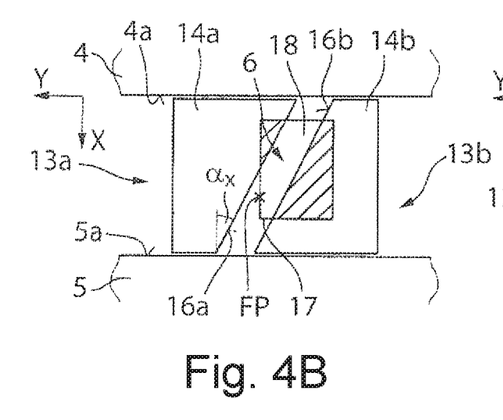

To avoid these problems, in the case of the machine 1 shown in FIGS. 4A and 4B, the two mutually facing side edges 16a, 16b, which are oriented parallel, of the workpiece bearing faces 14a, 14b of the two support carriages 13a, 13b are oriented obliquely, e.g., at an angle $\alpha_X$ with respect to the X direction. By contrast, in the case of the machine 1 shown in FIGS. 4A and 4B, the two mutually facing side edges 4a, 5a of the stationary workpiece bearing faces 4, 5 of the workpiece bearing tables run, as in FIGS. 3A and 3B, parallel to the Y direction, such that the two support carriages 13a, 13b can be moved in each case to a desired position $Y_{UA}$, $Y_{UB}$ in the Y direction to support the workpiece 2 or a workpiece part 18 that is to be separated by cutting. The actuation of the support carriages 13a, 13b and of the further movable components is performed by means of the control device 15 in the manner described further above in conjunction with FIGS. 1A and 1B.

In the example shown in FIG. 4A, in each case one covering element 19a, 19b for covering the intermediate space between the two workpiece bearing faces 4a, 4b outside the gap 6 formed between the support carriages 13a, 13b is attached to the support carriages 13a, 13b, more specifically to the mutually averted side edges, running in the X direction, of the workpiece bearing faces 14a, 14b. The covering elements 19a, 19b extend over the entire width b of the gap 6, are moved conjointly in the Y direction during the movement of the support carriages 13a, 13b, and, in the example shown, are formed in the manner of a roller shutter. The covering elements 19a, 19b may also be of some other form, for example of telescopic form, of scale-like form, in the form of a rolled-up band, etc. The top side of the covering elements 19a, 19b is situated at the level of the workpiece bearing faces 14a, 14b or of the workpiece bearing faces 4, 5. The covering elements 19a, 19b serve for bearing non-stiffened subregions, which project into the gap 6, of the remaining workpiece 2, which, if not borne in this way, could possibly collide with the support carriages 13a, 13b. It is self-evident that covering elements 19a, 19b may also be used in the example shown in FIG. 2 as bearings for overhanging subregions of the remaining workpiece 2.

As shown in FIG. 4B, by means of the orientation of the mutually facing side edges 16a, 16b of the workpiece bearing faces 14a, 14b of the support carriages 13a, 13b at an angle $\alpha_X$ with respect to the X direction, it is possible, by contrast to the example shown in FIG. 3A, for a workpiece part 18, the outer edges of which are oriented parallel or perpendicular to the X direction or Y direction, to be supported by the workpiece bearing faces 14a, 14b of both support carriages 13a, 13b, in order to thereby increase the process reliability.

In the example shown in FIGS. 4A and 4B, however, owing to the side edges 16a, 16b of the workpiece bearing faces 14a, 14b of the two support carriages 13a, 13b being oriented at an angle $\alpha_X$ with respect to the X direction, in the event of a movement of the machining head in the X direction, it is necessary for the support carriages 13a, 13b to be moved in the Y direction in order that the position of the gap 6 situated between the two support carriages 13a, 13b follows the movement of the laser cutting head 9. Therefore, in the actuation of the support carriages 13a, 13b, it is necessary for the position of the "tool center point" of the X-axis movement (workpiece axis+additional axis in the X direction) to be implemented in transformed form.

Figure 6:
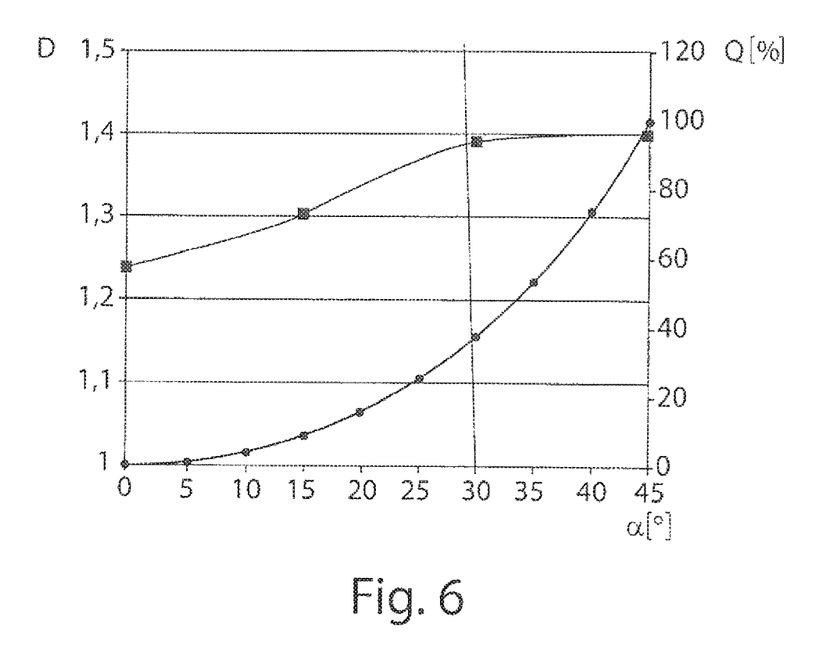
FIG. 6 is a diagram showing the cost and the benefit of the oblique orientation of the side edges of the two support carriages as a function of the angle with respect to the X direction.

As can be seen from the lower curve in the graph of FIG. 6, the required movement travel and thus the ratio D of the required dynamics of the support carriages 13a, 13b to the original dynamics becomes greater the greater the angle $\alpha_X$ (between 0° and 45°) between the respective side edges 16a, 16b of the workpiece bearing faces 14a, 14b and the X direction. The process reliability Q, i.e., the certainty that a workpiece part 18 of arbitrary shape is always supported by the workpiece bearing faces 14a, 14b of both support carriages 13a, 13b during the cutting of the contour 17 of the workpiece part, likewise increases with increasing angle $\alpha_X$, as can be seen in FIG. 6 on the basis of the upper curve (in %). A good compromise between support action or process reliability Q and required dynamics D for the movement of the support carriages 13a, 13b in the Y direction is achieved with an angle $\alpha_X$ between approximately 20° and 40°, e.g., between 25° and 35°, for example, with an angle $\alpha_X$ of approximately 30°.

Figure 5:
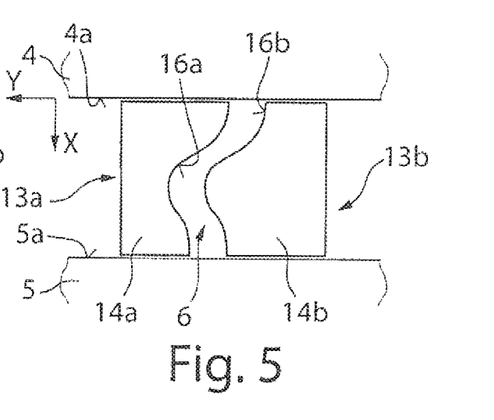
FIG. 5 is an illustration of two support carriages, the mutually facing side edges of which run in arcuate fashion.

As an alternative to the example shown in FIGS. 4A and 4B, in which the two mutually facing side edges 16a, 16b of the support carriages 13a, 13b run rectilinearly, it is the case in an example shown in FIG. 5 that the two mutually facing side edges 16a, 16b of the two support carriages 13a, 13b are of arcuate or curved form. In this way, the parallelism between the mutually facing side edges 16a, 16b of the bearing faces 14a, 14b of the support carriages 13a, 13b and the outer or inner contours of cut workpiece parts 18 can be yet further reduced, whereby the risk of sections or segments of the workpiece parts 18 hanging downward into the gap 6 between the two support carriages 13a, 13b is also further reduced.

Figure 7A:
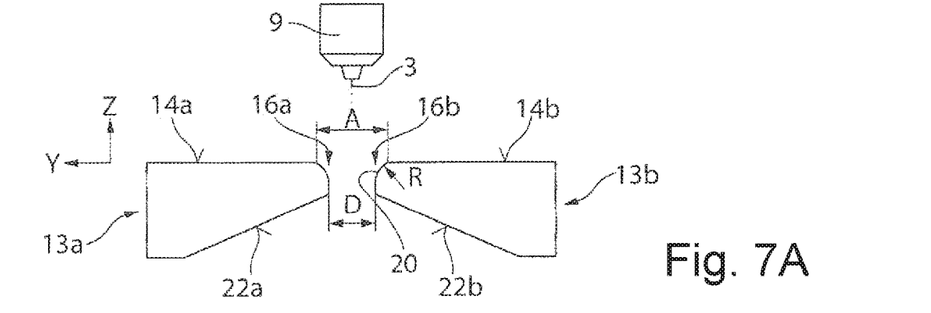
FIGS. 7A and 7B are illustrations of two support carriages, the mutually facing side edges of which have a rounding or a bevel.
Figure 7B:
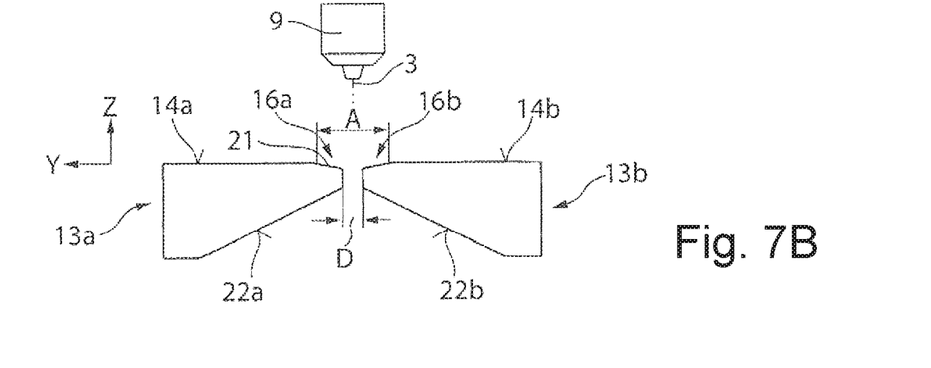

For effective prevention of collisions between downwardly hanging sections of workpiece parts 18 and the support carriages 13a, 13b, it has proven to be advantageous if the mutually facing side edges 16a, 16b of the two workpiece bearing faces 14a, 14b of the support carriages 13a, 13b have a rounding 20 or a bevel 21, cf. FIGS. 7A and 7B. The rounding 20 shown in FIG. 7A has a radius of curvature R of approximately 2-5 mm. The bevel 21 shown in FIG. 7B extends from the workpiece bearing face 14a, 14b approximately 3 mm downward in the Z direction and approximately 4.5 mm in the Y direction as far as the side edge 16a, 16b of the respective support carriage 13a, 13b. In the examples shown in FIGS. 7A and 7B, a (minimum) spacing D between the two support carriages 13a, 13b, which may, for example, be approximately 4-5 mm, is smaller than a spacing A between the planar workpiece bearing faces 14a, 14b, which may, for example, be approximately 10-12 mm.

To minimize the adhesion of slag to a respective support carriage 13a, 13b, it is advantageous if the support carriages 13a, 13b, at their bottom side 22a, 22b averted from the workpiece bearing face 14a, 14b, taper toward the respective side edge 16a, 16b of the workpiece bearing face 14a, 14b, or if the support carriages have an (oblique) recess, as is likewise illustrated in FIGS. 7A and 7B.

To further reduce the adhesion of slag, it is likewise advantageous for the side edge 16b of a respective support carriage 13b to be formed from copper, because this material exhibits good thermal conductivity and the slag formed during the cutting of steel and aluminum does not adhere well to copper. To produce the side edge 16a, 16b of one of the support carriages 13a, 13b from copper as material, there are numerous possibilities. In the example shown in FIGS. 8A and 8B, a copper sheet 23 is attached to the (second) support carriage 13b, which copper sheet is detachably fastened to the support carriage 13b, for example by means of a screw connection, and can be exchanged if necessary.

Figure 8A:
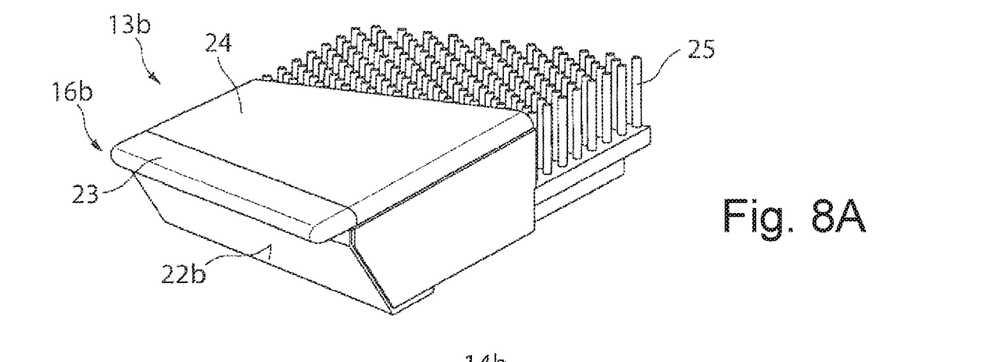
FIGS. 8A and 8B are illustrations of a support carriage, the workpiece bearing face of which has three differently formed subregions.
Figure 8B:
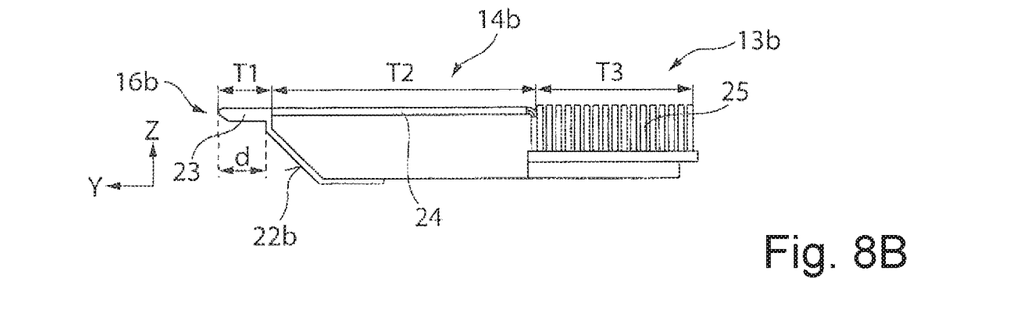

In the example shown in FIGS. 8A and 8B, the workpiece bearing face 14b of the support carriage 13b is divided into three parts and has a first, plate-shaped subregion T1, on which the side edge 16b is formed and that forms an upper section of the copper sheet 23. plate-shaped first subregion T1 is adjoined by a second subregion T2, which in the example shown is in the form of a corrugated sheet 24, which permits stable bearing of a workpiece and that exhibits good sliding characteristics. The corrugated sheet 24 is directly adjoined in the Y direction by a third subregion T3 of the workpiece bearing face 14b, which third subregion is in the form of a brush-type bearer 25 and has a multiplicity of brushes that are flexible and facilitate sliding of workpieces 2 lying on the workpiece bearing face 14b.

The plate-shaped first subregion T1 makes it possible for the tapered bottom side 22b of the support carriage 13b to be offset from the side edge 16b of the workpiece bearing face 14b by a distance d, whereby the adhesion of slag to the support carriage 13b or to the copper sheet 23 can be reduced. It is self-evident that the first support carriage 13a may also be designed in the manner shown in FIGS. 8A and 8B. By means of the second subregion T2, the spacing between the side edge 16b and the brush-type bearer 25 is additionally increased, in order to prevent damage of the brushes by flying sparks.

In summary, by means of the neither parallel nor perpendicular orientation of at least two side edges 4a, 5a or 16a, 16b, which delimit the gap 6, of the respective workpiece bearing faces 4, 5 or 14a, 14b with respect to the outer edges of the workpiece 2 or with respect to the X direction during the cutting machining process, in particular during the separation by cutting, it is possible for improved, areal support of workpiece parts 18 to be realized.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A machine for the separative machining of a plate-shaped workpiece by a processing beam, the machine comprising:
    a machining head configured to direct the processing beam onto the plate-shaped workpiece;
    a first movement device configured to bidirectionally move the plate-shaped workpiece in a first direction (X);
    a second movement device configured to bidirectionally move the machining head in a second direction (Y); and
    at least two workpiece support units including at least two workpiece bearing faces for supporting the workpiece, a gap configured for the passage of the processing beam being formed between the workpiece bearing faces, wherein mutually facing side edges of at least two of the workpiece bearing faces are oriented non-perpendicularly and non-parallel with respect to the first direction (X),
    wherein at least two movable support carriages are positioned between two stationary workpiece bearing faces, wherein the at least two movable support carriages have in each case one workpiece bearing face for supporting workpiece parts that are cut during the cutting machining process, and wherein the mutually facing side edges of the workpiece bearing faces of the support carriages that face toward one another are oriented non-perpendicularly and non- parallel with respect to the first direction (X).

2. The machine of claim 1, wherein the mutually facing side edges that are oriented non-perpendicularly and non-parallel with respect to the first direction (X), are formed on the two stationary workpiece bearing faces.

3. The machine of claim 2, wherein the mutually facing side edges of the two stationary workpiece bearing faces are oriented at an angle ($\alpha Y$) with respect to the second direction (Y).

4. The machine of claim 1, further comprising a drive unit configured to displace the machining head in the first direction (X).

5. The machine of claim 1, wherein the mutually facing side edges of the two stationary workpiece bearing faces are oriented perpendicularly with respect to the first direction (X).

6. The machine of claim 1, wherein the mutually facing side edges of the workpiece bearing faces of the at least two support carriages run rectilinearly and at an angle (aX) with respect to the first direction (X).

7. The machine of claim 6, wherein the mutually facing side edges of the workpiece bearing faces of the at least two support carriages run at an angle ($\alpha X$) of between 20° and 40° with respect to the first direction (X).

8. The machine of claim 1, wherein the mutually facing side edges of the workpiece bearing faces of the at least two support carriages run in arcuate fashion.

9. The machine of claim 1, wherein at least one of the mutually facing side edges of the workpiece bearing faces of the at least two support carriages has a beveled edge.

10. The machine of claim 1, wherein at least one support carriage of the at least two support carriages, on its bottom side averted from the workpiece bearing face, tapers toward the side edge of the workpiece bearing face.

11. The machine of claim 1, wherein the workpiece bearing face of at least one support carriage of the at least two support carriages is formed, at the side edge of the workpiece bearing face, from a metallic material.

12. The machine of claim 11, wherein the metallic material comprises copper.

13. The machine of claim 1, wherein the workpiece bearing face of at least one support carriage of the at least two support carriages has a plate-shaped subregion on which the side edge of the workpiece bearing face is formed.

14. The machine of claim 1, wherein the workpiece bearing face of the at least one support carriage of the at least two support carriages has a subregion in the form of a corrugated sheet.

* * * * *